R. B. MORTON.
CLUTCH.
APPLICATION FILED MAY 1, 1912.

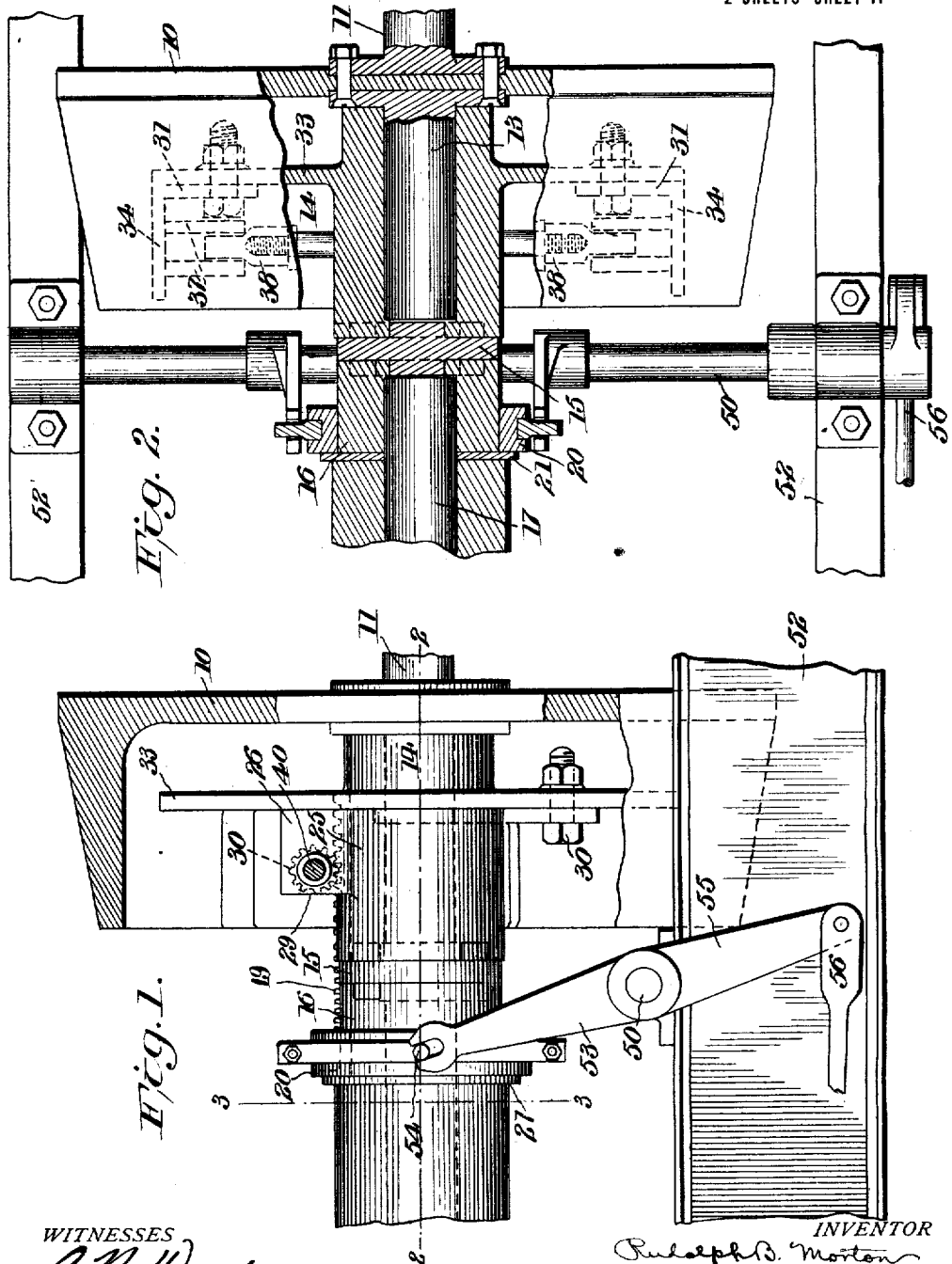

1,171,230.

Patented Feb. 8, 1916.
2 SHEETS—SHEET 2.

WITNESSES
C. N. Walker.
M. E. Smith.

INVENTOR
Rudolph B. Morton
By Hodges & Hodges
Attorneys

UNITED STATES PATENT OFFICE.

RUDOLPH B. MORTON, OF CLEVELAND, OHIO.

CLUTCH.

1,171,230. Specification of Letters Patent. Patented Feb. 8, 1916.

Application filed May 1, 1912. Serial No. 694,378.

*To all whom it may concern:*

Be it known that I, RUDOLPH B. MORTON, a citizen of the United States, residing at Cleveland, in the county of Cuyahoga and State of Ohio, have invented new and useful Improvements in Clutches, of which the following is a specification.

This invention contemplates certain new and useful improvements in clutches.

One of the objects of the invention is to provide an improved friction clutch so constructed that the driving and driven sections thereof may be readily connected and disconnected without throwing unnecessary strains upon the shafting.

A further object is to provide clutching elements of improved construction, and simple and efficient means for operating the same.

A further object is to provide improved means for supporting the various parts in their operative relation.

The invention will be hereinafter fully set forth and particularly pointed out in the claims.

Figure 3:
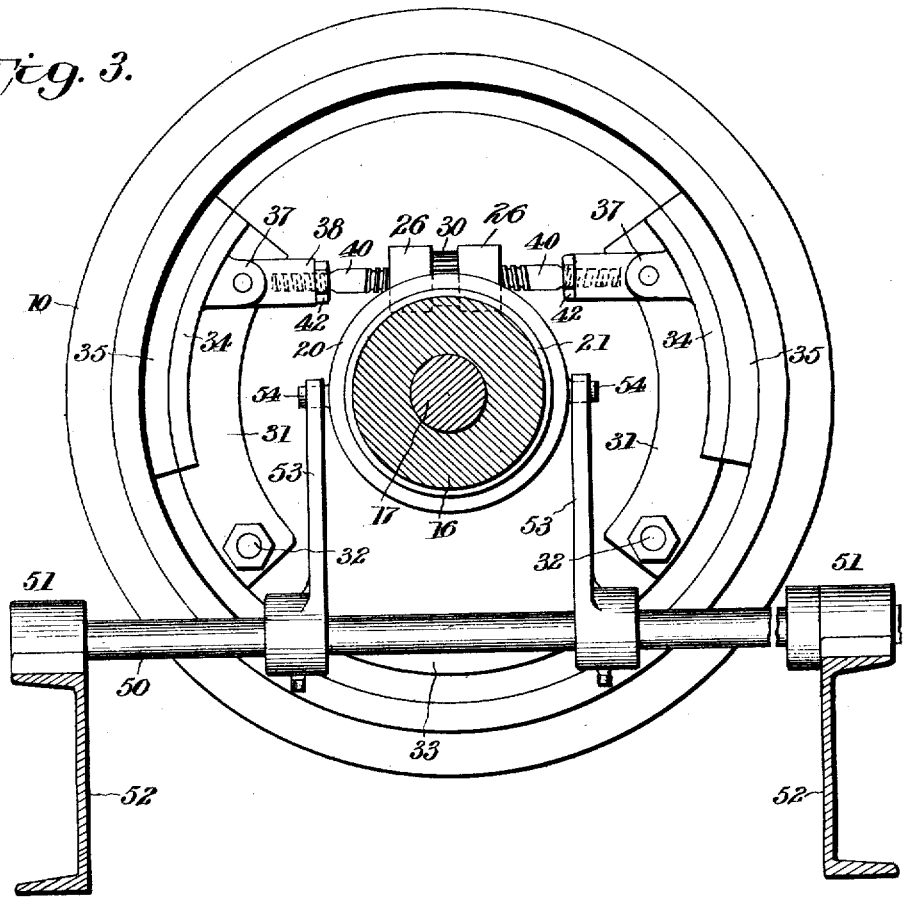
Figure 4:
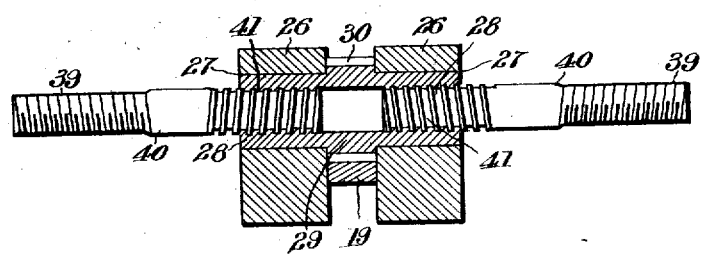

In the accompanying drawing:—Figure 1 is a side elevation illustrating my improved clutch, parts being in section. Fig. 2 is a horizontal section on line 2—2 of Fig. 1. Fig. 3 is a cross section on line 3—3 Fig. 1. Fig. 4 is a detail view illustrating the turn buckle elements.

Referring to the drawing, 10 designates the driving element of the clutch, preferably the fly wheel of an engine (not shown), although I do not desire to limit myself in this particular. Said fly wheel is bolted or otherwise secured to the engine shaft 11, and is provided with an extension 13 on which is rotatably mounted the hub 14 of the driven element of the clutch. Said hub 14 is connected by means of a universal coupling 15 with a collar 16 secured upon the driven shaft 17, said coupling serving to prevent strains and friction on the parts resulting from disalinement of the parts because of vibration from the engine, and shocks from other sources. The hub 14 and collar 15 are provided with coinciding grooves 18, 18' to receive a slidable toothed rack 19 which is secured to an operating collar 20 slidably mounted on the collar 15, a stop 21 being provided to limit the movement of said sliding collar in one direction. The hub 14 is provided with a flattened portion 25 to which are secured spaced apart bearing blocks 26 provided with coinciding bores 27 in which are rotatably mounted the opposite ends 28 of a turnbuckle member 29. The middle portion of said member is enlarged to form annular shoulders contacting with the bearing blocks 26 to prevent endwise or longitudinal movement. The middle or enlarged portion of the member 29 is provided with teeth at 30 forming a pinion which meshes with the teeth of the rack 19.

The clutch shoes each comprise curved members 31 pivotally mounted at 32 upon an annular flange 33 carried by the hub 14, each shoe being provided with a horizontally extended flange 34. Secured to each shoe is a clutch block 35 of suitable material designed to bear against the inner face of the flange 36 of the fly wheel. Each clutch shoe is also provided with ears or lugs 37 arranged in pairs and designed to pivotally support threaded connecting sleeves 38. Each connecting sleeve 38 receives one threaded end 39 of a longitudinally adjustable rod 40, the other end 41 of each rod 40 being threaded and in engagement with one end of the turnbuckle member 29. Lock nuts 42 serve to normally prevent relative movement between the sleeves 38 and the rods 40, although permitting relative adjustment of said parts. It will be noted, that the pivotal connection between the lugs 37 and the pivot point 32 of each clutch shoe are approximately in alinement, *i. e.,* they would be intersected by a line arranged approximately at right angles to rods 40.

The collar 20 may be operated in any suitable or preferred manner. In the drawings, I have illustrated a rock shaft 50 mounted to oscillate in suitable bearings 51 carried by a supporting frame 52, said rock shaft being provided with crank arms 53 which engage pins 54 carried by the collar 20. The rock shaft 50 is oscillated by means of a crank arm 55 connected with a connecting rod 56 leading to any suitable or desired point from which it is desired to operate the clutch.

The operation is as follows:—When it is desired to connect the driving and driven members of the clutch the rock shaft 50 is oscillated to effect a movement of the rack 19 by shifting collar 20. The longitudinal movement of the rack 19 effects a rotation of the nut-like member 29, which coöperates with the rods 40 to form a turnbuckle, and effects a longitudinal movement of said rods away from said member 40 causing the brake shoes to move toward the flange 36 of the fly wheel 10. A very slight movement of the clutch shoes will bring the clutch blocks into close frictional engagement with said flange 36, effectively connecting the hub 14 with the fly wheel so that the two will rotate in unison and without slipping. It is obvious, of course, that rotation of the hub 14 effects a corresponding rotation of the driven shaft 17 through the coupling 15. To unclutch or disengage the driving and driven members it is only necessary to reverse the above described movement of the rack 19, whereby the turnbuckle construction will withdraw the brake shoes and their blocks from engagement with the flange of the fly wheel. It will be particularly noted that when the clutch shoes have once been operated to engage the flange 36 they are securely locked in such engagement and accidental disengagement thereof is impossible and yet but little power is required to engage and disengage when these functions are desired.

Having thus explained the nature of my invention and described an operative manner of constructing and using the same, although without attempting to set forth all of the forms in which it may be made, or all of the forms of its use, what I claim is:—

1. An improvement in clutches comprising a driving member provided with a flange, a driven member, clutch shoes pivotally supported by said driven member opposite said flange, connecting sleeves pivotally connected with said shoes, rods adjustably connected with said connecting sleeves, a rotatable turnbuckle member adjustably engaging the other end of each rod, and means for rotating said turnbuckle member.

2. An improvement in clutches comprising a driving member, a driven member, clutch shoes pivotally supported by said driven member, spaced apart bearing blocks carried by said driven member, a turnbuckle member rotatably mounted between said bearing blocks, turnbuckle rods adjustably engaging said rotatable turnbuckle member, connecting sleeves pivotally connecting with said clutch shoes and adjustably engaging said turnbuckle rods, means for preventing relative movement of said sleeves and said rods, and means for rotating said turnbuckle member.

3. An improvement in clutches comprising a driving member provided with a flange, a driven member, clutch shoes pivotally supported by said driven member and provided with flanges extending parallel with the flange of the driving member, sleeves pivoted to the free ends of said shoes, rods adjustably connected with said sleeves, means for preventing relative movement of said rods and sleeves, a rotatable turnbuckle member adjustably engaging the other end of each rod, and means for rotating said turnbuckle member.

4. An improvement in clutches comprising a driving member provided with an overhanging flange, a driven member including a hub provided with a radial flange, clutch shoes pivotally supported by said radial flange and provided with flanges extending parallel with said overhanging flange, sleeves pivotally connected with the free ends of said shoes, rods adjustably connected with said sleeves, means for preventing relative movement of said rods and sleeves, a rotatable turnbuckle member adjustably engaging said rods, and means for rotating said turnbuckle member.

5. An improvement in clutches comprising a shaft, a driving member secured thereto and having an overhanging flange, a driven member including a hub rotatably mounted on said shaft and provided with a radial flange, and a longitudinal groove, said hub having a flattened portion, clutch shoes pivotally supported by said radial flange and arranged to engage said overhanging flange, spaced apart blocks secured to the flattened portion of said hub, a rotatable turnbuckle member supported by said blocks, turnbuckle rods positively connected to said shoes and adjustably connected to said rotatable member, and a slidable rack in said groove for rotating said rotatable member.

6. An improvement in clutches comprising a driving member provided with an overhanging flange, a driven member including a hub provided with a radial flange, said hub having a flattened portion, clutch shoes pivotally supported by said radial flange and each provided with a flange arranged approximately parallel with said overhanging flange, spaced apart blocks secured to the flattened portion of said hub, a rotatable turnbuckle member mounted between said blocks, sleeves pivotally connected with the free ends of said shoes, turnbuckle rods adjustably engaging said sleeves and also adjustably engaging said rotatable member, means for preventing relative movement of said sleeves and said rods, and means for rotating said rotatable member.

7. An improvement in clutches comprising a driving member provided with an extension and an overhanging flange, a driven member including a hub rotatably mounted on said extension, clutch shoes pivotally supported by said driven member opposite said flange, connecting sleeves pivotally connected with said shoes, rods adjustably connected with said connecting sleeves, a rotatable turnbuckle member adjustably engaging the other end of each rod, and means for rotating said turnbuckle member.

8. An improvement in clutches comprising a shaft, a driving member secured thereto and provided with an extension in alinement with said shaft, and also with an overhanging flange, a hub rotatably mounted on said extension and having a longitudinal groove, a driven shaft, means for operatively connecting said hub and said driven shaft, clutch shoes pivotally supported by said hub, a rotatable turnbuckle member carried by said hub, turnbuckle rods adjustably connected with said rotatable member, means for positively connecting said turnbuckle rods with said shoes, a rack slidably supported in the groove of said hub, said rotatable turnbuckle member being provided with a pinion meshing with said rack, a slidable collar for reciprocating said rack, and means for operating said collar.

In testimony whereof I have hereunto set my hand in presence of two subscribing witnesses.

RUDOLPH B. MORTON.

Witnesses:
WM. S. HODGES,
CHAS. E. RIORDAN.

Copies of this patent may be obtained for five cents each, by addressing the "Commissioner of Patents, Washington, D. C."